J. F. RULE.
GLASS APPARATUS.
APPLICATION FILED JUNE 23, 1919.

1,438,402.

Patented Dec. 12, 1922.
5 SHEETS—SHEET 1.

INVENTOR
J. F. Rule.

J. F. RULE.
GLASS APPARATUS.
APPLICATION FILED JUNE 23, 1919.
1,438,402.
Patented Dec. 12, 1922.
5 SHEETS—SHEET 3.
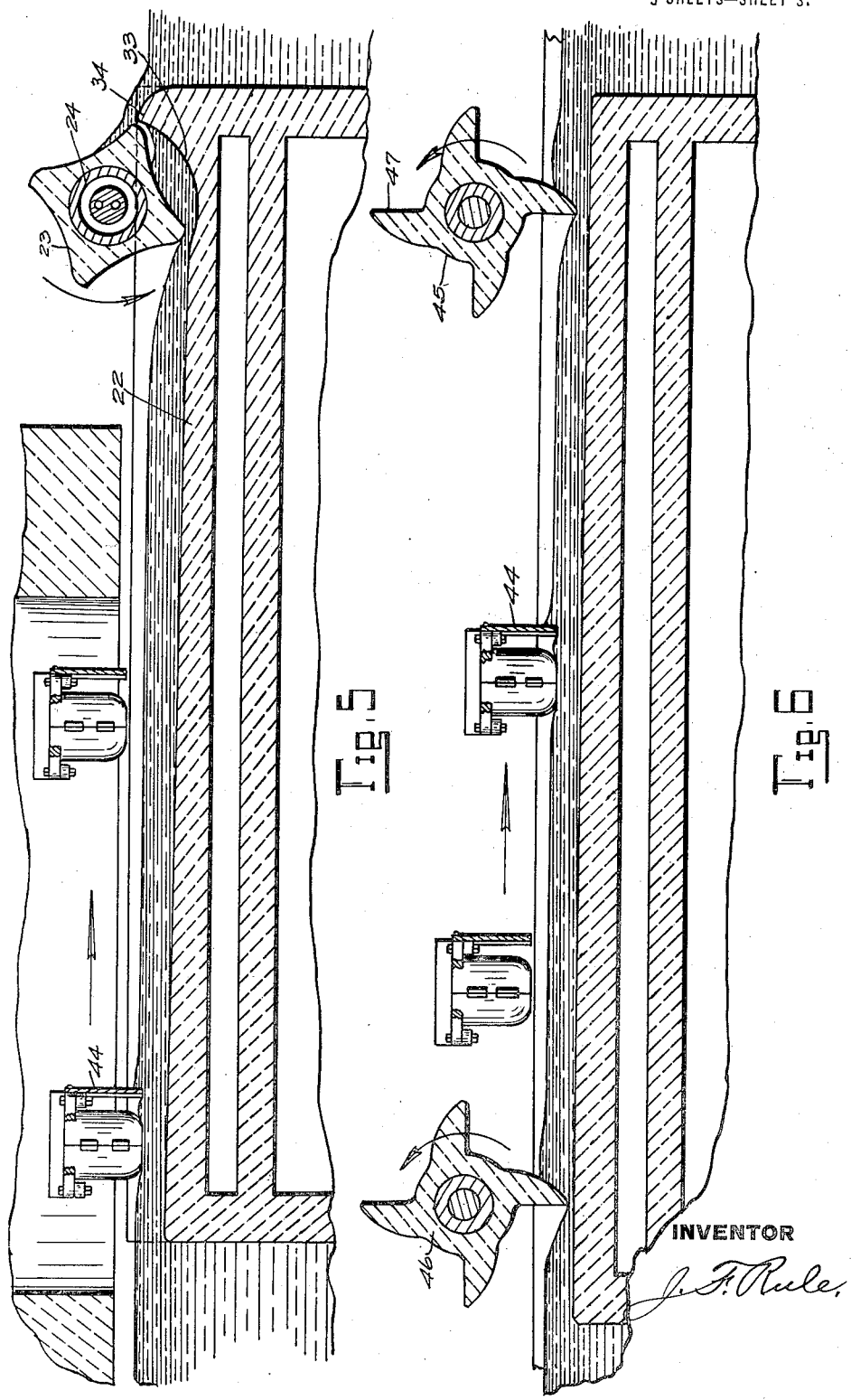
INVENTOR
J. F. Rule.

J. F. RULE.
GLASS APPARATUS.
APPLICATION FILED JUNE 23, 1919.

1,438,402.

Patented Dec. 12, 1922.

INVENTOR
J. F. Rule.

J. F. RULE.
GLASS APPARATUS.
APPLICATION FILED JUNE 23, 1919.
1,438,402.
Patented Dec. 12, 1922.
5 SHEETS—SHEET 5.
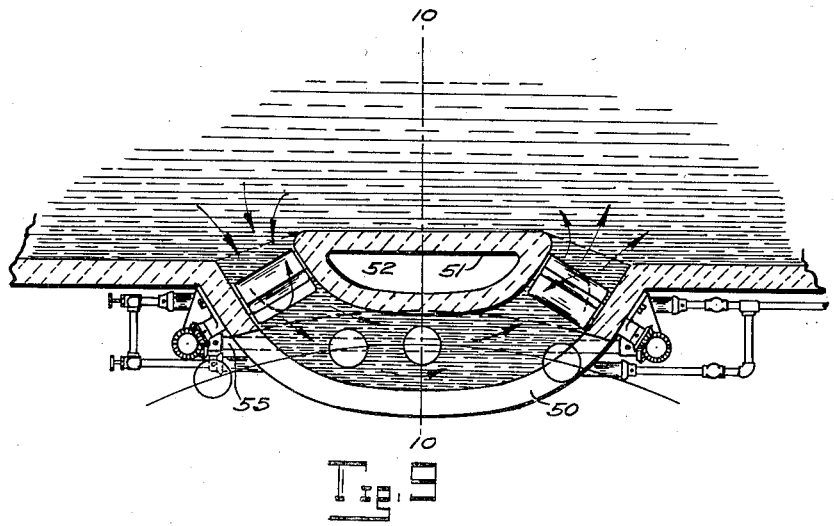
Fig. 9
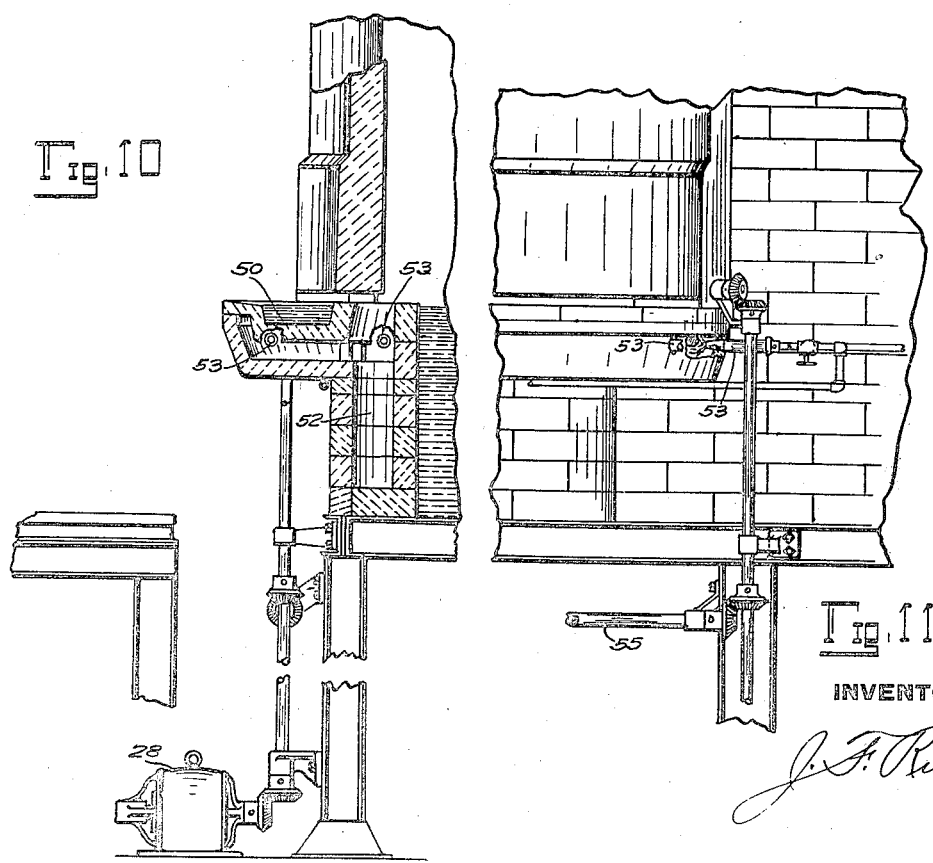
Fig. 10
Fig. 11
INVENTOR
J. F. Rule.

Patented Dec. 12, 1922.

1,438,402

UNITED STATES PATENT OFFICE.

JOHN F. RULE, OF TOLEDO, OHIO, ASSIGNOR TO THE OWENS BOTTLE COMPANY, OF TOLEDO, OHIO, A CORPORATION OF OHIO.

GLASS APPARATUS.

Application filed June 23, 1919. Serial No. 306,059.

*To all whom it may concern:*

Be it known that I, JOHN F. RULE, a citizen of the United States, residing at Toledo, in the county of Lucas and State of Ohio, have invented new and useful Improvements in Glass Apparatus, of which the following is a specification.

My invention relates to means for gathering glass from a tank or supply of molten glass and for maintaining a circulation of the glass past the gathering point. In gathering glass by means of devices such as punties, molds or receptacles which are repeatedly brought into contact with the supply of molten glass, as for example, with a machine having suction gathering molds which are successively brought into contact with the glass, it is necessary to maintain a movement or circulation of the glass past the gathering point so that a fresh surface of glass is presented to each succeeding gathering device. This circulation is necessary because of the disturbance and chilling of the glass at the gathering point. Each mold as it gathers its quantity of glass from the pot or tank, leaves a pocket or depression and also strings the glass out as the mold moves away from the glass. As the molten glass closes in after the mold is removed, it entraps more or less air, which may be carried into a succeeding mold in the form of blisters or bubbles, making the finished ware defective or useless. The gathering devices when repeatedly brought in contact with the glass at the same point also quickly chill it and render it unfit for gathering.

At the present day the majority of the bottles made in this country and various other articles are made on Owens automatic machines in which the blank molds are brought serially into contact with the molten glass and gather by suction. In order to secure the required movement of glass past the gathering point, a large continuously rotating tank is provided, into which the glass flows from a melting or refining tank. The molds are successively brought over the rotary tank and lowered into contact with the molten glass to gather the charges. The use of such rotating tank involves a heavy expense, as a large amount of fuel is required to keep the glass in the tank at the required high temperature. The expense involved in the construction and operation of the tank is also considerable.

An object of the present invention is to provide practical means for circulating the glass at a gathering area in or communicating with the melting or refining tank, and so constructing and arranging the tank that the glass may be gathered directly from said area, thereby eliminating the rotary tank. A large saving of fuel is thus effected. A further economy in fuel is effected by reason of the fact that by gathering directly from the refining tank the glass therein can be at a substantially lower temperature than is required when it is run into an intermediate tank before being gathered in the molds. The elimination of the rotary tank also results in a substantial reduction in space that is otherwise required.

Other features and advantages of the invention will appear hereinafter.

In the accompanying drawings which illustrate certain constructions embodying the principles of my invention:

Figure 5 is a sectional elevation on an enlarged scale at the line 5—5 on Figure 1.

Figure 6 is a similar view of a modified construction.

Figure 9 is a sectional plan view of a modified form of tank.

Figure 10 is a sectional elevation of the same at the line 10—10 on Figure 9.

Figure 11 is a fragmentary front elevation of the tank shown in Figures 9 and 10.

Figure 1:
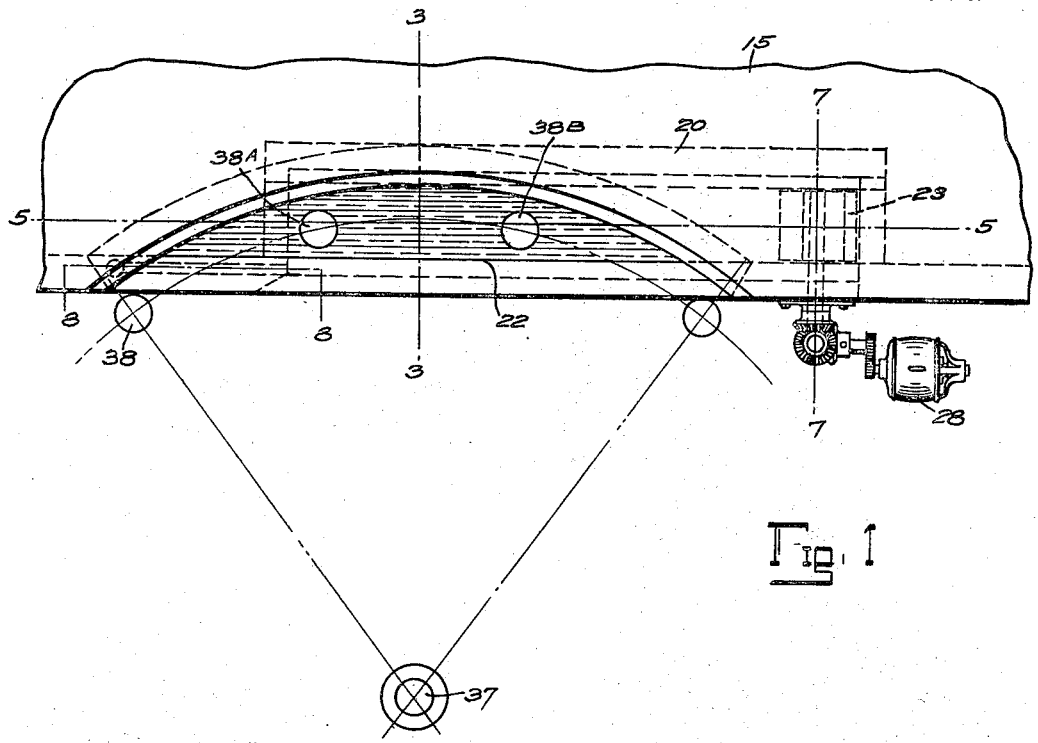
Figure 1 is a plan view of the tank and shows diagrammatically the path of the molds past the gathering point.
Figure 2:
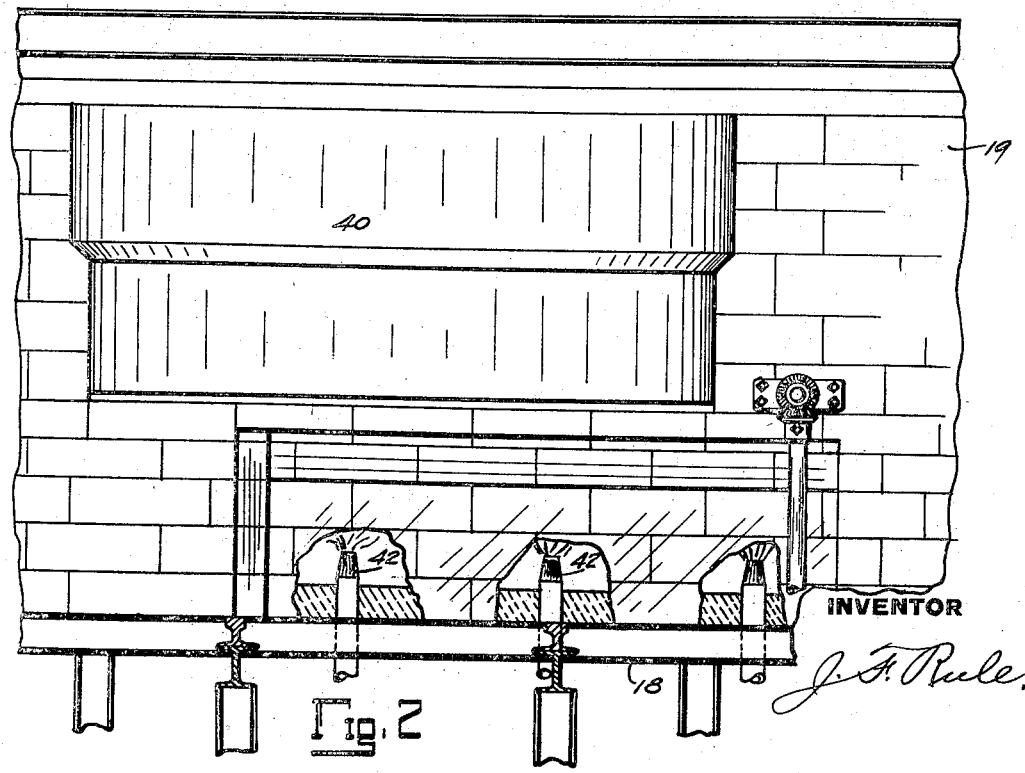
Figure 2 is a front elevation of the tank shown in Figure 1.

The glass 16 is melted in a continuous melting tank 15 which may have a refining chamber or compartment from which the glass is drawn. The tank comprises a floor 17 supported on a framework 18. The front wall 19 of the furnace comprises a section 20 which is set in some distance back of the front wall and extends upward from the furnace floor to a point above the level of the glass. The upper portion of the section 20 projects forward and has formed in its upper surface a channel or passageway 22 through which the glass is caused to circulate continuously by means hereinafter pointed out. The floor of the channel or sluice 22 is below the normal level of the glass, the channel being open at one or both ends, as indicated in Figures 5 and 6.

Figure 7:
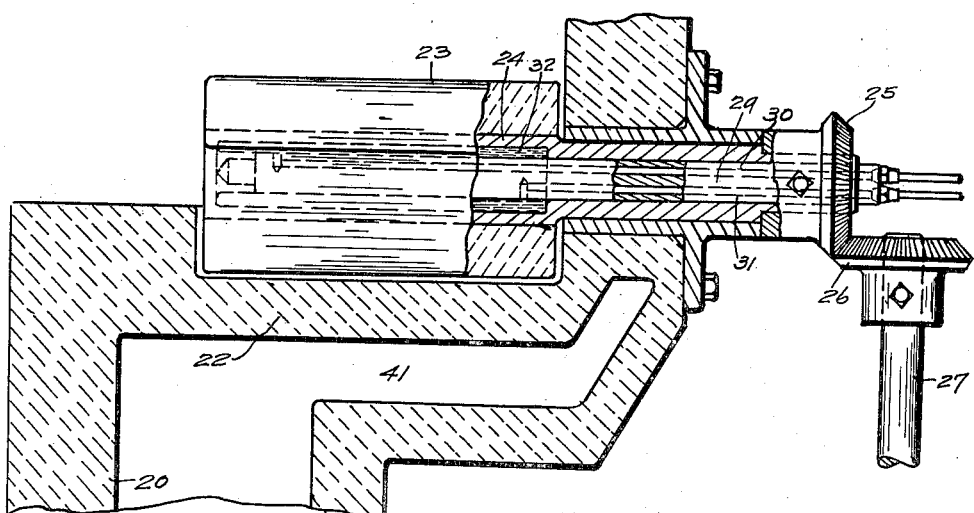
Figure 7 is a section on an enlarged scale at the line 7—7 on Figure 1.

A continuous circulation or flow of the glass through this channel is effected by means of an actuator 23, which may be in the form of a paddle wheel or propeller made of fire clay or other refractory material and mounted on a hollow shaft 24. This shaft (Fig. 7) has secured thereto a bevel gear wheel 25 driven by a gear 26 on a vertical shaft 27, the latter connected through suitable gearing to a motor 28. Means may be provided for circulating water or other cooling medium through the hollow shaft 24 to prevent overheating. For this purpose a central stationary shaft 29 extends within the rotary shaft 24, said shaft having inlet and outlet passageways 30 and 31 for the cooling liquid 32. The propeller 23 is rotated continuously in the direction indicated by the arrow (Fig. 5) and thereby causes a continuous circulation or flow of the glass from left to right through the channel 22. The floor of the channel beneath the propeller may be curved as indicated at 33 to conform to the path of the propeller blades, and extends upward to form a lip or dam 34 which may be at or above the level of the glass and over which the glass is lifted by the propeller. The floor of the channel 22 may be inclined to assist the flow of glass and to maintain a more nearly uniform depth of glass throughout the length of the channel. It will be noted that the surface of the glass in the channel is an extension of the surface of glass in the body of the tank, and the channel may be considered as a part of the tank.

Figure 3:
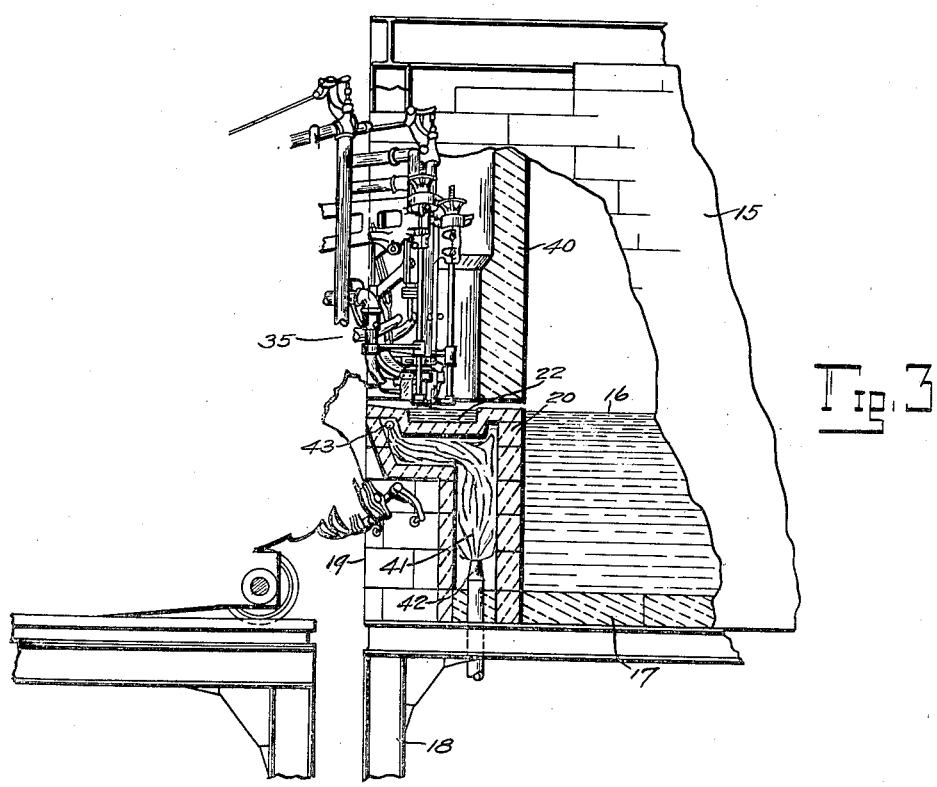
Figure 3 is a section at the line 3—3 on Figure 1.
Figure 4:
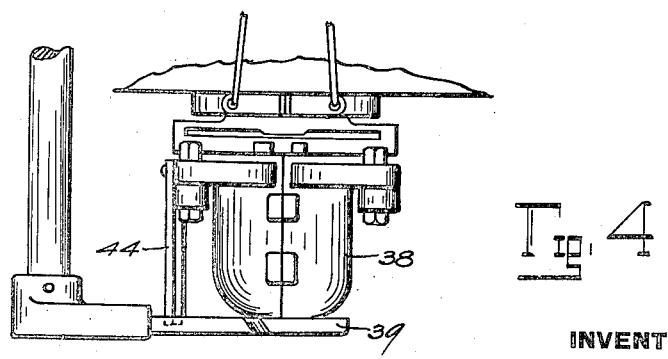
Figure 4 shows a suction mold and a skimming device associated therewith.

An automatic glass blowing machine 35, (Fig. 3), here shown as an Owens automatic machine, is arranged to gather the glass by suction from the channel 22. This machine, which may be of the construction shown for example in the patent to LaFrance, No. 1,185,687, comprises a frame rotating continuously about a vertical axis 37 (Fig. 1) and carrying an annular series of suction molds 38, which are brought serially over the glass in the channel 22. Each mold as it arrives at about the position 38$^A$ (Fig. 1) moves downward into contact with the glass and is filled by suction while traveling between the points 38$^A$ and 38$^B$. At the position 38$^B$ the mold is lifted sufficiently to clear the edge of the tank and a knife 39 severs the glass which strings from the mold to the tank.

Figure 8:
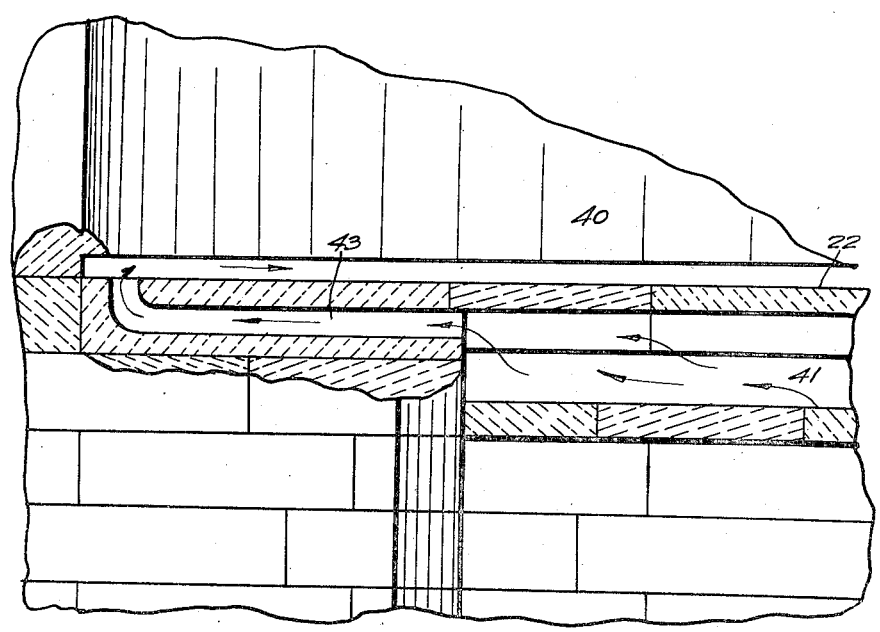
Figure 8 is a section at the line 8—8 on Figure 1.

The front wall of the furnace comprises a jack arch 40 above the gathering trough and curved inwardly to expose a portion of the glass for gathering and to provide clearance for the rotating parts of the machine above the gathering point. A small clearance is provided between the lower end of the jack arch and the wall 20, which prevents escape of an undue amount of heat from the furnace, while permitting circulation of heated gases over the glass in the channel sufficient to maintain the required temperature of the glass in the channel. A heating chamber 41 is formed within the hollow wall 20, said chamber being extended forwardly beneath the floor of the channel 22 and along the side walls thereof to provide for heating the entire under surface of the channel. The latter is thereby maintained at a sufficiently high temperature to prevent the glass flowing therethrough from chilling or freezing. A free flow of the glass through the channel is thus assured. The heat in the chamber 41 may be supplied by burners 42. The burning gases cover the under surface of the channel and pass through passageways 43 at the ends of the heat chamber, and escape between the channel 22 and jack arch 40, as indicated by the arrows (Fig. 8). These escaping gases assist in keeping the exposed surface of the glass hot.

The temperature and condition of the glass within the channel may be regulated and controlled to a considerable extent by regulating the temperature in the heating chamber 41. The velocity of the glass through the channel can be regulated by varying the speed of the driver 23. The flow of the glass need only be sufficiently rapid to present a fresh surface of glass to each succeeding mold. A more rapid movement of the glass may at times be desirable to prevent undue chilling from exposure to the outside air and to prevent the glass from stiffening and accumulating on the walls of the channel.

When the glass is exposed to the comparatively cold outside air there is a tendency for the surface to become quickly chilled and form a skin or layer of comparatively cold stiff glass which does not flow so freely as the glass beneath the surface. In order to insure a surface circulation of the glass I provide in connection with each mold, a skimmer 44 which may be in the form of a plate attached to the mold and which dips into the glass just in advance of the mold and serves as a positive means to skim the glass and insure a circulation or flow of the surface layer. The plates 44 extend transversely of the channel and may be as wide or wider than the molds. In some instances the number of skimmers may be less than the number of gathering molds. Thus, for example, they may be attached only to alternate molds, or to every third mold. The mold itself acts in a measure as a skimmer or propeller as it moves through the glass while gathering a charge, but not to so marked a degree as the plate 44. Ordinarily the skimmer 44 may be dispensed with as the propeller 23 is effective to maintain the required circulation of glass.

Figure 6 shows a modified construction in which two propellers 45 and 46 are provided, one at or near each end of the channel. Each of these propellers comprises paddles or blades 47, the number and form of which may be varied as desired. The number of these rotary drivers may also be increased if desired. By reference to Figure 1 it will be seen that only a comparatively small surface of the glass is directly exposed to the outside air, so that a comparatively small amount of heat is lost in gathering the glass. The driver 23 is located some distance beyond the exposed surface of the glass, where the temperature is sufficiently high to prevent the glass from chilling and accumulating on the driver to an undesirable extent.

Figures 9, 10 and 11 illustrate a modified form of furnace in which a gathering trough 50 projects forward beyond the front wall of the furnace, the trough being curved and having its ends terminating in the body of the tank. The rear wall of the trough 50 is formed by the front wall of a hollow section 51 forming part of the front wall of the furnace. The section 51 provides a heat chamber 52 similar to the heat chamber 41 in Figure 3. This heat chamber includes a space or compartment extending beneath the floor of the trough and upward in front of the front wall of said trough so that the entire surface of the trough with which the flowing glass contacts may be maintained at a high temperature to prevent cooling of the glass. This temperature may be sufficiently high to increase the temperature and fluidity of the glass in the trough. In order to localize the heat beneath the trough, burners 53 may be placed beneath and adjacent the ends of the trough and project flames horizontally along its under surface. The burners 53 may be used in conjunction with the burners 42 if desired.

In Figure 9 I have shown two propellers, one adjacent each end of the trough 50. These may be of the same form as the propellers 45 and 46, shown in Figure 5, or any other approved form. Under some working conditions either one of the propellers may be omitted, the other being then sufficient to maintain the circulation of the glass.

The two propellers are preferably driven by the same motor and at the same speed. For this purpose a horizontal shaft 55 is connected through suitable trains of gears at its ends to the respective propellers. The glass is preferably caused to flow through the trough in the same direction that the gathering molds are moving. It will be seen that the propellers operate to produce a gravity flow of the glass through the gathering trough. It will be understood, however, that other means for keeping the glass in motion may be employed. The skimmers 44 will be more or less effective for advancing the glass, depending on the depth to which they enter the glass. This may in some instances cause a sufficient circulation or movement of the glass without other means.

Variations may be resorted to without departing from the spirit and scope of my invention.

What I claim is:

1. The combination of a glass furnace, a channel having its ends terminating in the furnace, and automatic means appurtenant to said channel and furnace to maintain a continuous gravity flow of molten glass from the body of glass in the furnace through the channel and to return the glass to the furnace, said channel presenting an exposed area of glass accessible to gathering devices.

2. The combination of a tank to contain molten glass, a channel having a receiving end and a discharge end both within the tank and providing a passageway through which the glass may be caused to flow from the main body of glass in the tank and back into said body, and means contacting with the glass in the channel for causing the glass to flow through the channel and back into the tank, said channel separating the glass therein from the body of glass in the tank and presenting an exposed surface of glass for gathering.

3. The combination of a tank to contain molten glass, a channel having a receiving end and a discharge end both within the tank and providing a passageway through which glass may be caused to flow directly from the main body of glass in the tank and from said discharge end directly back into and means contacting with the glass in the channel for causing the glass to flow through the channel and back into the tank, said body of glass, said channel separating the glass therein from the body of glass in the tank and comprising an open portion outside the furnace walls presenting an exposed surface of flowing glass accessible to glass gathering devices.

4. The combination of a tank for molten glass, a channel having its ends within the main body of the tank, and means to cause a stream of molten glass to flow from the tank through the channel and from the channel directly into the tank, said stream being separated by the channel walls from the body of glass in the furnace, the receiving end of the channel being open and the floor of the channel a short distance below the normal level of the glass in the tank.

5. The combination of a furnace comprising a melting tank, a wall of the furnace including a concaved jack arch, and a shallow trough or channel through which molten glass is caused to flow in a stream separated by the channel walls from the body of glass in the furnace, said glass in the trough comprising an exposed surface below and outside of the jack arch from which glass may be gathered, the ends of said channel being open to said body of glass in the furnace so that the glass flows directly from the furnace into the trough and from the trough directly back into the furnace.

6. The combination with a tank to contain molten glass, of a trough having one end open and beneath the level of the glass in the tank, and a propeller running in the glass adjacent the other end of the trough and operative to propel glass directly from the trough into the body of the tank and thereby cause glass to flow through the trough.

7. The combination with a tank to contain molten glass, of a trough having one end open and beneath the level of the glass in the tank, a propeller adjacent the other end of the trough having propeller blades extending transversely of the trough and arranged to dip into the glass in the trough and means to rotate the propeller and thereby cause a flow of glass through the trough and back into the tank.

8. The combination with a tank to contain molten glass, of a trough or passageway opening at one end into the tank in position to receive the glass, said trough presenting an exposed surface of glass external to the outer walls of the tank for gathering, and a propeller operating on the glass in the channel at a point separated from the gathering area and exerting a propelling force on the glass in the trough by which glass is caused to flow through the trough and back into the tank.

9. The combination with a tank to contain molten glass, of a trough or passageway opening at one end into the tank in position to receive the glass, said trough presenting an exposed surface of glass external to the outer walls of the tank for gathering, and a continuously rotating propeller by which the glass is caused to flow through the trough, and by which the ungathered glass is returned to the tank.

10. The combination with a tank to contain molten glass, of a trough having an open end within the glass in the tank, said trough having at the other end a dam or wall projecting upward above the floor of the trough, and a propeller operating in the glass in the trough to force the glass from the trough over said dam, thereby causing a flow of glass through the trough, said trough being arranged to provide a gravity flow therethrough from said open end to the propeller, the glass being directed from the propeller back into the tank.

11. The combination with a tank to contain molten glass, of a trough having an open end within the glass in the tank, said trough having at the other end a dam or wall projecting upward above the floor of the trough, a propeller by which the glass is forced from the trough over said dam, thereby causing a flow of glass through the trough, and automatic means to continuously rotate said propeller and cause a substantially constant even flow of glass through the trough, said propeller arranged above and dipping into the flowing glass.

12. The combination with a stationary melting tank for glass, a channel having its ends in the tank, means to maintain a continuous movement of a surface portion of the glass through the channel past the gathering point and back into the tank, said means comprising a propeller within the walls which confine the main body of glass in the tank, said propeller being positioned outside the glass and dipping into the glass in the channel, and means to continuously drive the propeller.

13. The combination with a tank to contain molten glass, of a trough having its ends both within the main body of the tank and providing a passageway separate from the glass containing space within the tank, means to maintain a circulation of a stream of glass separate from the mass of glass in the furnace, from said mass through the trough and back into said mass, and means to supply localized heat to the outer surface of the floor and side walls of the trough and thereby prevent the glass from cooling and adhering to the walls of the trough.

14. The combination of a tank to contain molten glass, a trough or sluice arranged to permit a flow of glass therethrough and back into the tank, a machine comprising a series of gathering receptacles operable automatically to successively gather charges of glass from said trough, and means independent of said machine to maintain said flow of glass.

15. The combination with a melting tank, of a trough or sluice having its ends within the tank and through which the glass is adapted to flow, said trough presenting a gathering surface projected beyond the wall of the tank, a machine comprising gathering receptacles successively brought into position to gather glass from said trough, and propellers on said machine arranged to dip into the glass with said receptacles at points separated from said receptacles and cause a circulation of the glass through the trough.

16. The combination of a mold adapted to gather by suction from a pool of glass and movable along the surface of glass while gathering, and a plate carried with the mold to project downward into the glass and cause a movement of the glass past the gathering area.

17. A machine comprising in combination, a ring of continuously traveling molds arranged to be brought successively to the gathering point over a surface of molten glass and to advance along said surface while gathering the glass, and skimming plates traveling with the molds and projected into the glass to cause a surface flow of the latter.

18. The combination of a traveling suction mold, and a plate traveling therewith in advance of the mold, said plate extending transversely to the direction of travel.

19. The combination with a furnace to contain molten glass, of a sluice or trough having bottom and side walls extending along a wall of the furnace, and automatic means to maintain a circulation of glass from the furnace through said trough and back into the furnace.

20. The combination with a furnace to contain molten glass, of a stationary sluice or trough extending along a wall of the furnace, and means to cause a stream of glass, separate from the mass of glass in the furnace, to flow through said trough and back into the furnace, the furnace comprising a reentrant or concave wall above the trough to expose a surface of glass for gathering.

21. The combination with a tank to contain molten glass, of a channel having its ends within the tank, means to cause molten glass to flow from the tank through the channel in a stream separated from the body of glass in the tank and back into the tank, a series of suction gathering devices, and means to move them serially into contact with the glass in the trough and cause them to travel in contact with the glass in the direction the glass is flowing.

22. The combination of a melting tank to contain molten glass, means to provide an extension of the surface area of the glass in the body of the tank, said extension presenting a gathering surface external to the tank walls, means to maintain a continuous gravity flow of glass from the body of the tank outward over said extension and return a portion of the flowing glass back into the tank, and automatic means to gather glass from said extension.

Signed at Toledo, in the county of Lucas and State of Ohio, this 19th day of June, 1919.

JOHN F. RULE.